(12) United States Patent
Hegemann et al.

(10) Patent No.: US 9,679,204 B2
(45) Date of Patent: Jun. 13, 2017

(54) DETERMINING THE CHARACTERISTICS OF A ROAD SURFACE BY MEANS OF A 3D CAMERA

(71) Applicant: Conti Temic microelectronic GmbH, Nuremberg (DE)

(72) Inventors: Stefan Hegemann, Wangen (DE); Stefan Heinrich, Achern (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 405 days.

(21) Appl. No.: 14/364,773

(22) PCT Filed: Jan. 28, 2013

(86) PCT No.: PCT/DE2013/100028
§ 371 (c)(1),
(2) Date: Jun. 12, 2014

(87) PCT Pub. No.: WO2013/117186
PCT Pub. Date: Aug. 15, 2013

(65) Prior Publication Data
US 2014/0347448 A1 Nov. 27, 2014

(30) Foreign Application Priority Data
Feb. 10, 2012 (DE) ........................ 10 2012 101 085

(51) Int. Cl.
*H04N 13/02* (2006.01)
*G06K 9/00* (2006.01)
(Continued)

(52) U.S. Cl.
CPC ....... *G06K 9/00805* (2013.01); *B60W 40/064* (2013.01); *B60W 40/068* (2013.01);
(Continued)

(58) Field of Classification Search
CPC .......... G06K 9/00805; G06K 9/00791; G06K 9/00798; G01B 11/30; G01B 11/306
See application file for complete search history.

(56) References Cited

U.S. PATENT DOCUMENTS

| 6,807,473 B1 | 10/2004 | Tran |
| 7,411,486 B2 | 8/2008 | Gern et al. |

(Continued)

FOREIGN PATENT DOCUMENTS

| DE | 198 56 510 | 9/1999 |
| DE | 101 55 488 | 5/2003 |

(Continued)

OTHER PUBLICATIONS

Partial English translation of Japanese Office Action in Japanese Patent Application No. 2014-555940, mailed Aug. 3, 2016, 3 pages.

(Continued)

*Primary Examiner* — Sath V Perungavoor
*Assistant Examiner* — Xiaolan Xu
(74) *Attorney, Agent, or Firm* — W. F. Fasse

(57) ABSTRACT

A method and a device are provided for detecting the condition of a pavement or roadway travel surface on which a vehicle is traveling. A 3D camera acquires 3D camera image data including at least one image of surroundings including the roadway travel surface extending in front of the vehicle in the direction of motion thereof. Transverse height profiles of the roadway travel surface that respectively extend along transverse lines extending transversely to the vehicle's direction of motion are determined from the 3D camera image data. The condition of the roadway travel surface is detected from the determined transverse height profiles.

18 Claims, 4 Drawing Sheets

(51) Int. Cl.

| | |
|---|---|
| *G01C 7/04* | (2006.01) |
| *G01S 17/42* | (2006.01) |
| *G01S 17/46* | (2006.01) |
| *B60W 40/064* | (2012.01) |
| *B60W 40/068* | (2012.01) |
| *G01B 11/30* | (2006.01) |
| *G06T 7/40* | (2017.01) |
| *G06T 7/90* | (2017.01) |
| *B60W 10/184* | (2012.01) |
| *B60W 10/20* | (2006.01) |

(52) U.S. Cl.
CPC .............. *G01B 11/306* (2013.01); *G01C 7/04* (2013.01); *G01S 17/42* (2013.01); *G01S 17/46* (2013.01); *G06T 7/40* (2013.01); *G06T 7/90* (2017.01); *B60W 10/184* (2013.01); *B60W 10/20* (2013.01); *B60W 2420/42* (2013.01); *G06T 2200/04* (2013.01); *G06T 2207/10012* (2013.01); *G06T 2207/30261* (2013.01)

(56) References Cited

U.S. PATENT DOCUMENTS

| | | | |
|---|---|---|---|
| 7,808,523 | B2 | 10/2010 | Nishida et al. |
| 8,180,527 | B2 | 5/2012 | Mueller-Schneiders et al. |
| 8,306,747 | B1 * | 11/2012 | Gagarin .................. G01C 7/04 701/408 |
| 8,957,949 | B2 | 2/2015 | Randler et al. |
| 2002/0007661 | A1 * | 1/2002 | Takahashi ............... B60T 8/172 73/9 |
| 2002/0176608 | A1 | 11/2002 | Rose |
| 2010/0118116 | A1 | 5/2010 | Tomasz et al. |
| 2010/0315505 | A1 | 12/2010 | Michalke et al. |
| 2011/0063097 | A1 | 3/2011 | Naka et al. |
| 2011/0245995 | A1 | 10/2011 | Schwarz |
| 2012/0167663 | A1 | 7/2012 | Groitzsch et al. |
| 2012/0323444 | A1 * | 12/2012 | Rieger .................. B60W 40/11 701/37 |
| 2013/0332028 | A1 | 12/2013 | Heger et al. |
| 2014/0320644 | A1 | 10/2014 | Hegemann et al. |
| 2015/0344037 | A1 | 12/2015 | Siegel et al. |

FOREIGN PATENT DOCUMENTS

| | | | |
|---|---|---|---|
| DE | 102004055069 | 2/2006 | |
| DE | 102004048637 | 4/2006 | |
| DE | 102005039167 | 2/2007 | |
| DE | 102006012289 | 9/2007 | |
| DE | 102009033219 | 7/2010 | |
| DE | 102010013339 | 1/2011 | |
| DE | 102010027647 | 1/2011 | |
| DE | 102010020688 | 5/2011 | |
| DE | WO 2011110312 A1 * | 9/2011 | ............ B60W 40/11 |
| DE | 102011100907 | 1/2012 | |
| DE | 102010045162 | 3/2012 | |
| JP | 07-035522 A | 2/1995 | |
| JP | 2005-226671 A | 8/2005 | |
| JP | 2014-512291 A | 5/2014 | |
| WO | WO 2004/021546 | 3/2004 | |
| WO | WO 2011/007015 | 1/2011 | |

OTHER PUBLICATIONS

International Search Report of the International Searching Authority for International Application PCT/DE2013/100028, mailed Jun. 4, 2013, 3 pages, European Patent Office, HV Rijswijk, Netherlands.
PCT International Preliminary Report on Patentability including English Translation of PCT Written Opinion of the International Searching Authority for International Application PCT/DE2013/100028, issued Aug. 12, 2014, 9 pages, International Bureau of WIPO, Geneva, Switzerland.
German Search Report for German Application No. 10 2012 101 085.4, dated Nov. 9, 2012, 5 pages, Muenchen, Germany, with English translation, 5 pages.
Wang et al., "Study on Curb Detection Method Based on 3D Range Image by Laser Radar", 2005 IEEE Intelligent Vehicles Symposium, pp. 845-848.
Wijesoma et al., "Road-Boundary Detection and Tracking Using Ladar Sensing", IEEE Transactions on Robotics and Automation, vol. 20, No. 3, Jun. 2004, pp. 456-464.
Siegemund et al.,"Curb Reconstruction Using Conditional Random Fields", 2010 IEEE Intelligent Vehicles Symposium, University of California, San Diego, CA, USA, Jun. 21-24, 2010, pp. 203-210.
Oniga et al., "Polynomial Curb Detection Based on Dense Stereovision for Driving Assistance", 2010 13th International IEEE Annual Conference on Intelligent Transportation Systems, Madeira Island, Portugal, Sep. 19-22, 2010, pp. 1110-1115.

* cited by examiner

DETERMINING THE CHARACTERISTICS OF A ROAD SURFACE BY MEANS OF A 3D CAMERA

FIELD OF THE INVENTION

The invention relates to a method and a device for detecting the condition of a pavement surface by means of a (spatially resolving) 3D camera.

BACKGROUND INFORMATION

DE 102009033219 A1 shows a method and a device for determining a road profile of a traffic lane, said road profile extending in front of a vehicle in the direction of motion thereof. A road height profile of the traffic lane is determined by means of an image acquisition device or from vehicle proper-motion data, said traffic lane extending in front of the vehicle in the direction of motion thereof, wherein the image acquisition device may be a stationary camera that is arranged in the front section of the vehicle and comprises two image acquisition units. Active chassis control or damping may be controlled depending on the determined road height profile.

In driver assistance systems, the avoidance of accidents is getting more and more important. In particular, emergency braking systems make an important contribution to the avoidance of accidents. However, the effect of emergency braking systems decisively depends on the coefficient of friction of the ground with respect to the tire of the vehicle. In particular, the coefficient of friction of a wet pavement is considerably lower than that of a dry pavement.

WO 2011/007015 A1 shows a laser-based method for coefficient-of-friction classification in motor vehicles. To this end, signals of a lidar sensor/CV sensor directed toward the pavement surface are analyzed. After that, a coefficient of friction is assigned, particularly on the basis of the amplitude of the measured pavement surface. For example, one can estimate whether snow, asphalt or ice form the pavement surface.

It is obvious that prior-art methods for detecting the condition of a pavement surface are disadvantageous since either image acquisition and analysis is exclusively employed for chassis control or expensive lidar sensors that must be directed toward the pavement are required so that one might not be able to assess the condition of the pavement surface early enough.

SUMMARY OF THE INVENTION

An object of at least one of the embodiments of the present invention is to overcome the above disadvantages and to make possible a cheaper, more reliable and foresighted detection of the condition of a pavement surface.

The object is achieved by acquiring at least one image of the surroundings of the vehicle by means of a 3D camera. Height profiles of the pavement surface that extend transversely to the direction of motion of the vehicle are determined from the image data of the 3D camera along a plurality of lines. These lines are also referred to as scan lines. The height profile is scanned along each line. The condition of the pavement surface is detected from the determined height profiles, wherein the term "condition" particularly refers to the material of the pavement surface (tar, sand, ice, snow), the shape of the surface (even, uneven, bumpy), and local changes in the material or the evenness of the pavement surface (oil on road, puddle, chuckhole, ruts, etc.).

Preferably, the condition of the pavement surface is detected by comparing the determined height profiles with stored height profiles whose conditions are known. To this end, a condition classifier may be pretrained, whereby said classifier learns which detected height profiles correspond to which pavement surface conditions.

Alternatively or cumulatively, a quantitative analysis of the determined height profiles may be performed, e.g., frequency analysis (e.g., the width of individual depressions or bumps in/on the pavement surface and/or their extension in the direction of motion), amplitude determination, gradient formation or the like. On the basis of this quantitative analysis, typical conditions can be detected from characteristic quantities, e.g., intensive noise of the height profiles on a gravel path, whereas water or a layer of ice present on the pavement will result in a smooth pavement surface. Ice is frequently present in combination with snow next to the pavement.

In a preferred embodiment, 2D image data of at least one monocular camera of the 3D camera may be analyzed in addition to the determined height profiles and included into the detection of the condition of the pavement surface, wherein the analysis of the 2D image data does not have to be limited to the area of the pavement surface but may cover areas next to the pavement in particular.

According to an advantageous further development of the invention, the 2D image data may be analyzed by means of a texture or pattern analysis. In particular, the texture and/or pattern analysis may be a classification on the basis of trained textures and/or patterns, e.g., by means of a neural network. For example, a cobblestone pavement can be easily recognized in the 2D image on the basis of the characteristic textures or patterns.

Preferably, the 2D image data are analyzed by means of an edge and/or color analysis. Edge detection algorithms known per se may be used for edge detection. The position of the edges particularly facilitates or supports the detection of conditions of the pavement surface whose edge profile is known. For example, snow that is present in white areas on or next to the pavement can be detected by means of a gray-scale value or color analysis.

Advantageously, a (locally resolved) coefficient of friction between the pavement surface extending in front of the vehicle in the direction of motion thereof and the vehicle tire is estimated from the detected condition of the pavement surface, whereby one local coefficient of friction each can be estimated for pavement surface areas extending in front of the vehicle in the direction of motion thereof and differing in condition.

In a preferred embodiment, the at least one estimated coefficient of friction is used to precontrol steering interventions and/or braking interventions (ABS, ESP, ACC, Emergency Brake Assist, Lane Keeping Support, Evasive Maneuver Assist and/or Emergency Steer Assist).

Preferably, the 3D camera is a stereo camera or a photonic mixing detector camera/photonic mixing device (PMD) sensor.

The invention further comprises a device for detecting the condition of a pavement surface. To this end, a 3D camera, analyzing means and detecting means are provided. By means of the 3D camera, it is possible to acquire at least one image of the surroundings (including the pavement) extending in front of the vehicle in the direction of motion thereof. The analyzing means are used to determine height profiles of the pavement surface along a plurality of lines extending transversely to the direction of motion of the vehicle from the image data of the 3D camera. The detecting means are used to detect the condition of the pavement surface from the determined height profiles.

BRIEF DESCRIPTION OF THE DRAWINGS

In the following, the invention will be explained in greater detail on the basis of figures and exemplary embodiments, in which.

DETAILED DESCRIPTION OF EXAMPLE EMBODIMENTS OF THE INVENTION

Figure 1:
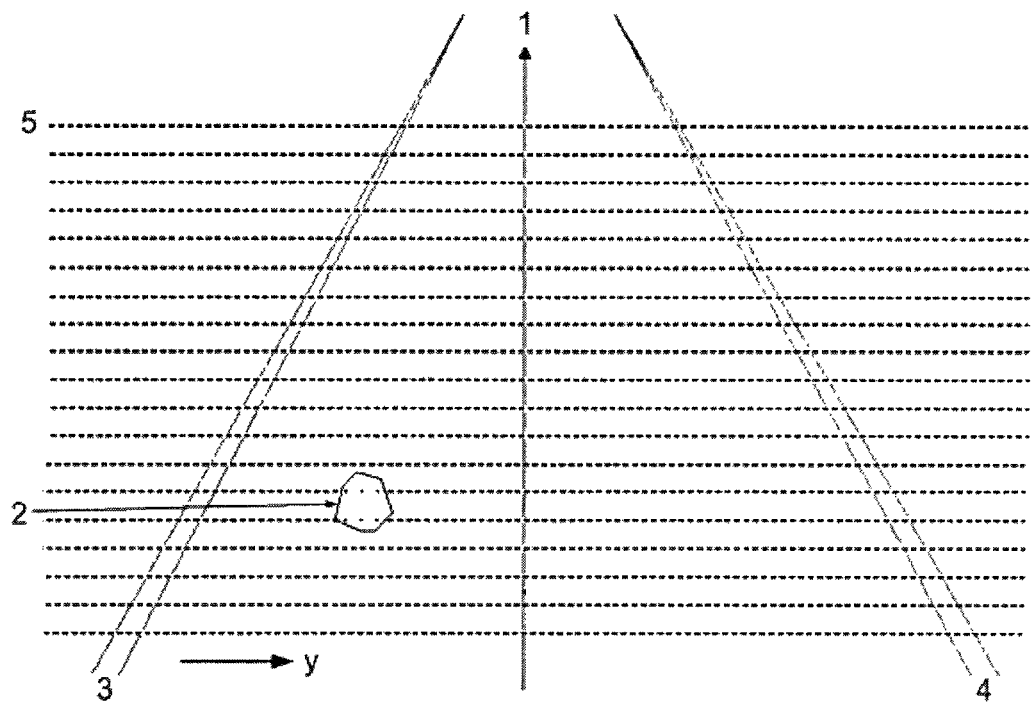
FIG. 1 shows lines extending transversely to the direction of motion, along which lines the height profile of the pavement surface is determined.

FIG. 1 schematically shows the scanning of the height profile (h) along lines (5) extending transversely (y) to the direction of motion (1) of the vehicle. The pavement surface is monitored from right to left, from left to right, or in both transverse directions (y) along the scan lines (5) that have an arbitrary predetermined density. A raised pavement boundary (e.g., a curbstone) demarcates the pavement surface on the left (3) and on the right (4). In the front left region, the essentially even pavement surface is locally lowered by a chuckhole (2) or a similar discontinuity.

Figure 2:
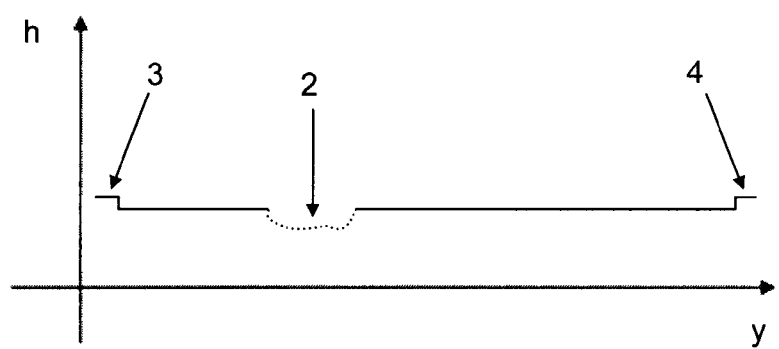
FIG. 2 shows an exemplary height profile of the pavement surface extending transversely to the direction of motion with a chuckhole in the pavement.

Said lowered spot can be clearly identified in the height profile (h) of the pavement surface extending transversely (y) to the direction of motion (1) (see FIG. 2). FIG. 2 shows, by way of example, the height profile (h) along a line (5) in the transverse direction (y). This height profile (h) has, aside from two steps caused by the raised pavement boundaries (3, 4), a lowered spot (see dotted line) located on the left, which lowered spot can be assigned to the chuckhole (2) shown in FIG. 1.

Figure 3:
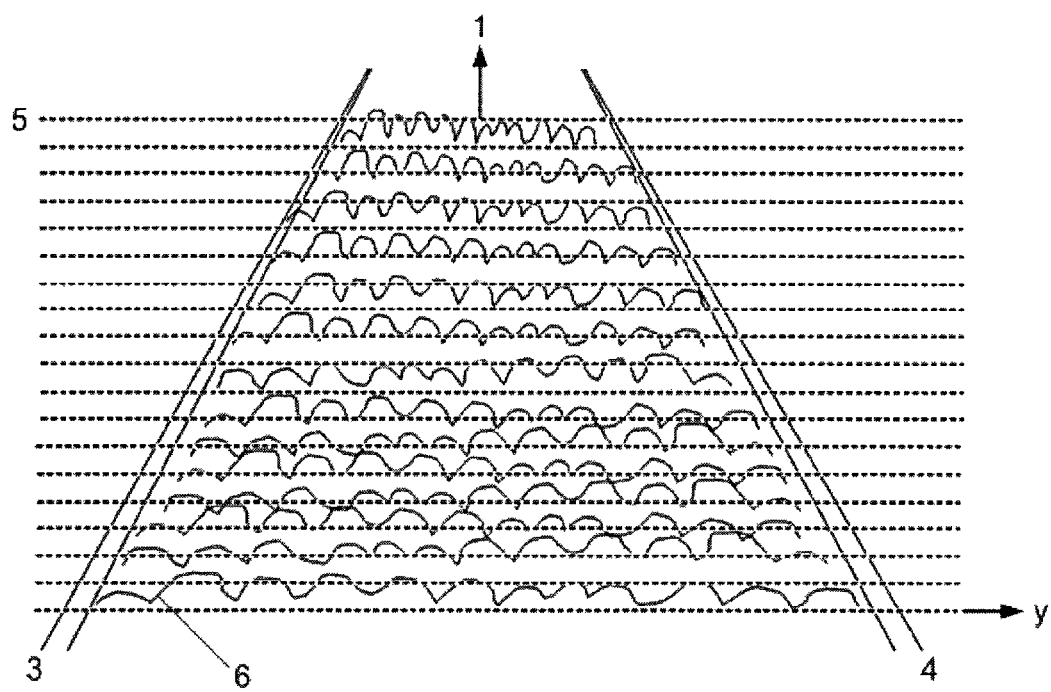
FIG. 3 shows the determination of height profiles extending transversely to the direction of motion for a cobblestone pavement.

FIG. 3 shows a cobblestone pavement (6). When a cobblestone pavement extending in front of the vehicle in the direction of motion thereof is detected, chassis components could be appropriately actuated and/or measures to improve the noise of the moving vehicle (active noise control or change in tire pressure) could be taken.

Figure 4:
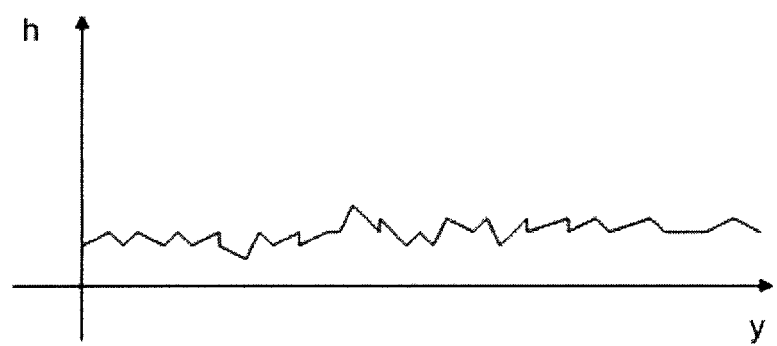
FIG. 4 shows a height profile for a cobblestone pavement.

FIG. 4 shows an exemplary height profile (h) of the cobblestone pavement (6) in the transverse direction (y). Further height profiles along further scan lines (5) in FIG. 3 would look similar. The typical width and height of the variations in the height profile (h) allow the assignment of such characteristic height profiles to a cobblestone pavement as a condition of the pavement surface. Detection may be additionally supported by a texture or pattern analysis of the 2D camera image (cf. FIG. 3), which analysis is an additional possibility of identifying the pavement surface as a cobblestone pavement and thus of verifying what has been detected from the height profiles determined from the 3D camera data.

Figure 5:
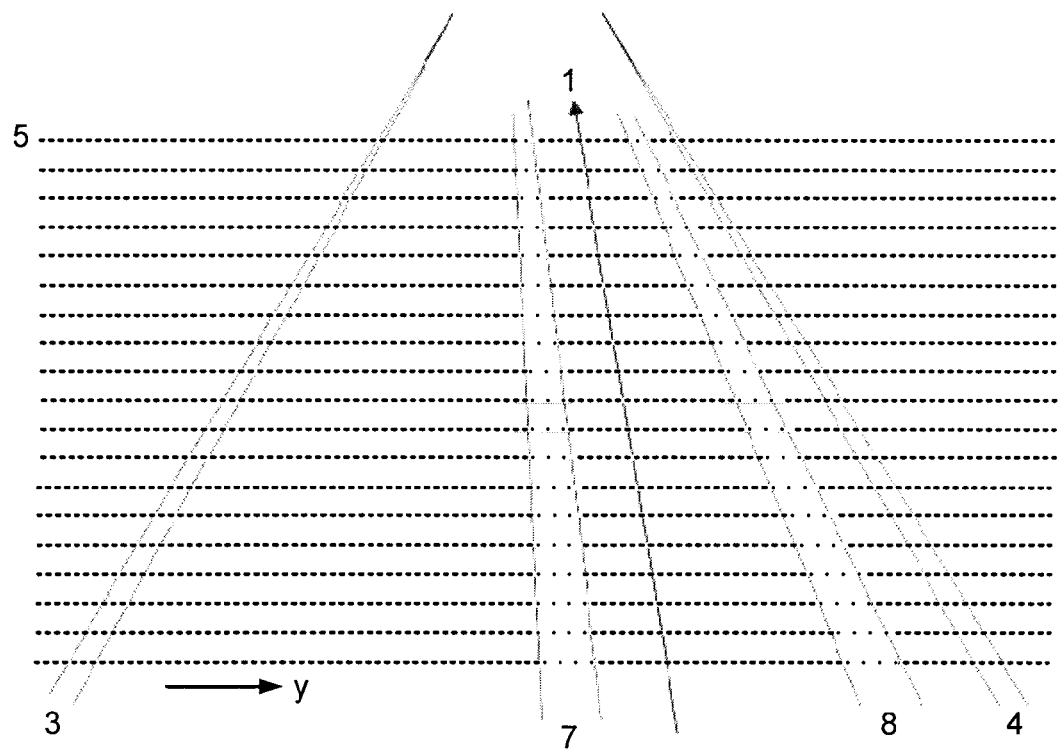
FIG. 5 shows a pavement surface with ruts.

FIG. 5 shows a pavement with two ruts (7, 8) extending parallel to the direction of motion (1) in the right part of the pavement surface.

Figure 6:
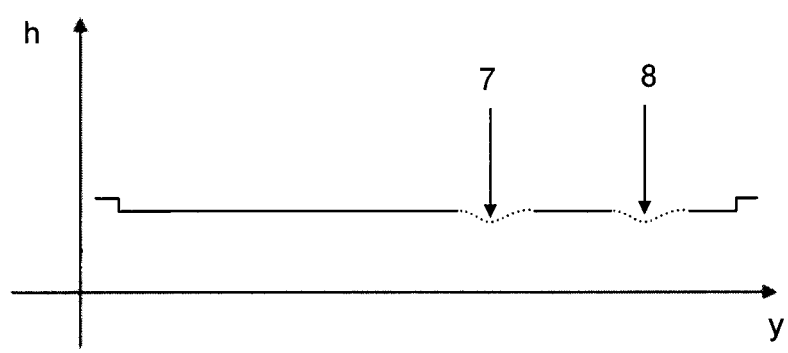
FIG. 6 shows an exemplary height profile extending transversely to the direction of motion with ruts in the pavement.

In the height profile (h) shown in FIG. 6, two lowered spots (see dotted lines) corresponding to the ruts (7, 8) can be identified in the right part of the pavement surface.

Figure 7:
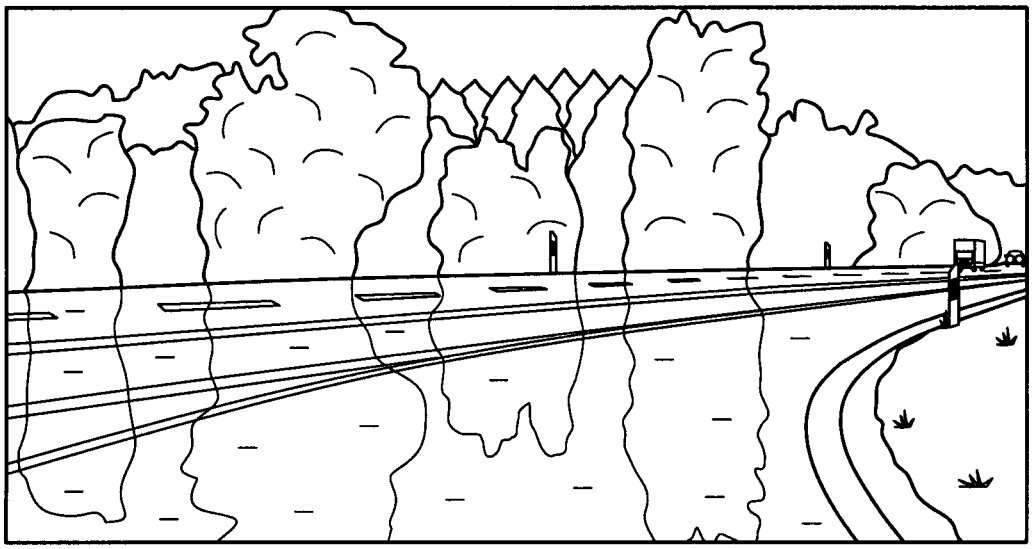
FIG. 7 shows a 2D camera image of a wet pavement.

FIG. 7 shows a 2D camera image (gray-scale image of a monocular camera) of a wet pavement surface. On the one hand, reflection effects on the wet pavement surface can be detected from the 2D image since trees (or the surroundings in general) are reflected on the pavement surface. On the other hand, reflection effects result in a greater supposed distance in the disparity image of the stereo camera. This supposed distance corresponds to the actual distance to the trees, which trees can be determined from the disparity image of the surroundings extending next to the pavement. It is thus possible to detect that a wet pavement surface extends in front of the vehicle in the direction of motion thereof, and the coefficient of friction can be estimated to be $\mu=0.4$.

Figure 8:
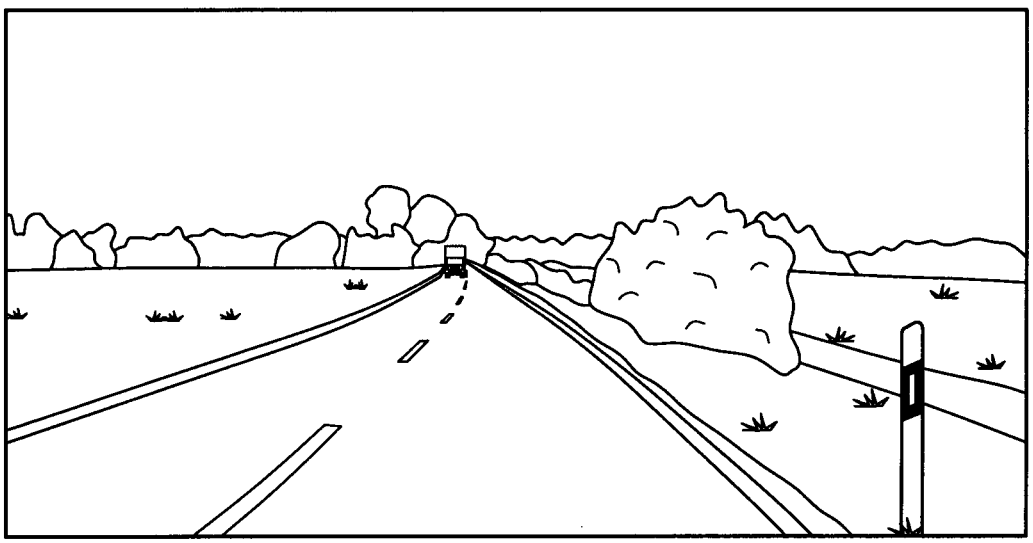
FIG. 8 shows a 2D camera image of a dry pavement.

FIG. 8 shows a 2D camera image of a dry pavement surface. The fact that the pavement surface is dry can be inferred, inter alia, from the absence of reflection effects, and the coefficient of friction can be estimated to be $\mu=0.9$.

The invention claimed is:

1. A method of detecting a condition of a roadway travel surface on which a vehicle is traveling, wherein the method comprises:
    with a 3D camera of the vehicle, acquiring 3D camera image data including at least one image of surroundings including the roadway travel surface extending in front of the vehicle in a direction of motion thereof on the roadway travel surface,
    analyzing the 3D camera image data and therefrom determining transverse height profiles of the roadway travel surface that respectively extend along successive transverse lines which extend transversely to the direction of motion of the vehicle on the roadway travel surface, and
    detecting the condition of the roadway travel surface from the transverse height profiles that have been determined from the 3D camera image data along the transverse lines.

2. The method according to claim 1, wherein the condition of the roadway travel surface is detected by comparing the transverse height profiles with stored height profiles having respective known conditions.

3. The method according to claim 1, further comprising additionally analyzing 2D image data of at least one monocular camera included in the 3D camera, and including the 2D image data into the detecting of the condition of the roadway travel surface.

4. The method according to claim 3, wherein the 2D image data are analyzed by at least one of a texture analysis and a pattern analysis.

5. The method according to claim 3, wherein the 2D image data are analyzed by at least one of an edge analysis and a color analysis.

6. The method according to claim 1, further comprising estimating a coefficient of friction from the detected condition of at least one area of the roadway travel surface extending in front of the vehicle in the direction of motion thereof.

7. The method according to claim 6, further comprising pre-controlling at least one of steering interventions and braking interventions of the vehicle dependent on the coefficient of friction.

8. The method according to claim 1, wherein the 3D camera is a stereo camera.

9. A device for detecting a condition of a roadway travel surface on which a vehicle is traveling in a direction of motion, wherein the device comprises:
- a 3D camera of the vehicle configured to produce 3D camera image data including an image of surroundings including the roadway travel surface in front of the vehicle in the direction of motion thereof,
- an image analyzer of the vehicle configured to analyze the 3D camera image data and therefrom to determine transverse height profiles of the roadway travel surface that respectively extend along successive transverse lines extending transversely to the direction of motion of the vehicle on the roadway travel surface, and
- a detecting circuit arrangement configured to detect the condition of the roadway travel surface from the transverse height profiles.

10. The method according to claim 1, wherein the analyzing of the 3D camera image data is performed by an image analyzer of the vehicle, and the detecting of the condition of the roadway travel surface is performed by a circuit arrangement of the vehicle.

11. The method according to claim 1, wherein the detected condition of the roadway travel surface comprises a detected material of the roadway travel surface selected from asphalt, gravel, sand and/or cobblestone.

12. The method according to claim 1, wherein the detected condition of the roadway travel surface comprises a detected material on the roadway travel surface selected from oil, water, ice and/or snow.

13. The method according to claim 1, wherein the detected condition of the roadway travel surface comprises a detected shape or evenness of the roadway travel surface along each respective one of the transverse height profiles and in the direction of motion of the vehicle across successive ones of the transverse height profiles.

14. The method according to claim 13, wherein the detected shape or evenness is selected from a bumpy surface shape, a rutted surface shape and/or a pot-holed surface shape.

15. The method according to claim 1, wherein the detecting of the condition of the roadway travel surface comprises performing a quantitative analysis of the transverse height profiles.

16. The method according to claim 15, wherein the quantitative analysis comprises a frequency analysis of the transverse height profiles.

17. The method according to claim 15, wherein the quantitative analysis comprises an analysis of the transverse width and longitudinal length of depressions and/or bumps represented in the transverse height profiles, wherein the transverse width extends along the transverse height profiles, and the longitudinal length extends in the direction of motion of the vehicle transversely across a succession of the transverse height profiles.

18. The method according to claim 15, wherein the quantitative analysis comprises an amplitude determination of an amplitude of roughness or unevenness represented in the transverse height profiles.

\* \* \* \* \*